United States Patent [19]

Tsuya et al.

[11] Patent Number: 5,074,971

[45] Date of Patent: Dec. 24, 1991

[54] PROCESS FOR PREPARING MAGNETIC DISK

[76] Inventors: Noboru Tsuya, 3-13-11, Hachimanyama Setagaya-ku, Tokyo; Tadao Tokushima, 1-18-1, Izumi, Hamamatsu-shi, Shizuoka-ken; Toshiro Takahashi, 350-29, Ose-cho, Jamamatsu-shi, Shizuoka-ken, all of Japan

[21] Appl. No.: 483,895

[22] Filed: Feb. 23, 1990

Related U.S. Application Data

[63] Continuation-in-part of Ser. No. 250,088, Sep. 2, 1988, Pat. No. 4,925,738.

[30] Foreign Application Priority Data

Sep. 30, 1987 [JP] Japan ................................ 62-248771

[51] Int. Cl.$^5$ ......................... C25D 11/20; B05D 5/02; B05D 5/08
[52] U.S. Cl. .................................. 205/162; 427/129; 205/223
[58] Field of Search .................... 204/37.6; 427/129; 428/472.2, 613, 694, 687, 609, 612, 141, 472

[56] References Cited

U.S. PATENT DOCUMENTS

| | | | |
|---|---|---|---|
| 4,650,708 | 3/1987 | Takahashi | 428/694 |
| 4,659,606 | 4/1987 | Wada et al. | 428/694 |
| 4,761,330 | 8/1988 | Tokoshima et al. | 428/694 |

FOREIGN PATENT DOCUMENTS

| | | | |
|---|---|---|---|
| 199271 | 10/1986 | European Pat. Off. | |
| 62-38543 | 2/1987 | Japan | 428/694 |
| 63-136315 | 6/1988 | Japan | 428/694 |
| 2142043 | 1/1985 | United Kingdom | |
| 2158098 | 11/1985 | United Kingdom | |

OTHER PUBLICATIONS

Patent Abstracts of Japan, vol. 9, No. 76 (P-346) (1799), 5 Apr. 1985 and JP-A-59 207 209 (Nippon Gakki Seizo K.K.).

Patent Abstracts of Japan, vol. 10, No. 198 (P-476) (2254) 11 Jul. 1986 and JP-A-61 42 721 (Toshiro Takashi).

Primary Examiner—John J. Zimmerman
Attorney, Agent, or Firm—Oblon, Spivak, McClelland, Maier & Neustadt

[57] ABSTRACT

This invention relates to a process for preparing a magnetic disk, which comprises (a) subjecting a substrate having an anodized aluminum film to mirror surface-finishing, (b) widening pores of the anodized aluminum film by chemical dissolution treatment so that the total area of pores becomes from 20 to 80% of the entire surface area, thereby retaining crystalline alumina of the anodized aluminum film extruded after the chemical dissolution treatment, and (c) coating the resultant substrate with a magnetic continuous thin film.

7 Claims, 8 Drawing Sheets

PROCESS FOR PREPARING MAGNETIC DISK

CROSS-REFERENCE TO RELATED APPLICATION

This application is a continuation in part of U.S. Pat. application Ser. No. 07/250,088 filed Sept. 2, 1988, now U.S. Pat. No. 4,925,738, and incorporated entirely herein by reference.

BACKGROUND OF THE INVENTION

The present invention relates to a process for preparing a magnetic disk by forming a magnetic continuous thin film on the surface of a substrate. More particularly, the present invention relates to a process for preparing a magnetic disk improved by dissolving problems concerning the friction coefficient of the surface and the sticking to a magnetic head.

A magnetic recording medium using a magnetic continuous thin film (hereinafter referred to as a "magnetic thin film") as a high density recording material is not widely used because of the problems in respect of mechanical durability and the like.

Namely, a recording medium using a magnetic thin film and having a very smooth surface is likely to lead to sticking when brought in contact with a magnetic head. Further, a liquid lubricant applied to the medium is easily removed by the contact with the magnetic head, whereby the friction coefficient increases, thus leading to head crush.

In order to avoid such problems, a mechanical texture method has been attempted in which scratch marks are mechanically imparted to the surface of the substrate by means of e.g. sand paper. However, it is very difficult to impart such scratch marks while controlling not to increase bit errors and not to cause the sticking to the magnetic head. Further, in the mechanically scratched texture, fine burrs exist on the surface, and they tend to peel off upon collision with the magnetic head and thus lead to head crush.

Japanese Unexamined Patent Publication No. 22220/1984 discloses the invention relating to a process for preparing a substrate for a magnetic disk, the improvements of which are to reduce the friction coefficient of the surface of the magnetic disk having a magnetic thin film formed on the substrate and to reduce a sticking force to a magnetic head.

This process comprises subjecting the surface of an aluminum alloy substrate coated with an Alumite layer to mirror surface-finishing, and etching the mirror surface-finished surface to form concave parts having a surface precision of Ra 70–1,400 Å.

The mirror surface-finishing in the cited process can be conducted by abrading, rubbing, polishing or other methods, thereby forming the mirror surface-finished surface having $R_{max}$ of at most 200 Å and Ra of at most 50 Å, but in this state, the sticking of a magnetic head occurs. In order to avoid the sticking of the magnetic head, the surface is etched to form convex parts in such manner as to have a surface precision of Ra 70–1,400 Å, but this process still has the following problems.

Firstly, the pore area ratio (ratio of the total area of pores to the entire surface area) is constantly about 10% before forming a magnetic thin film since the pores of the Alumite layer are not widened by the mirror surface-finishing and etching steps. Consequently, the contacting area of a magnetic head is relatively large, and it is therefore necessary to enlarge the surface roughness in such manner as to reduce the friction coefficient.

Secondly, the etching is plasma-etching carried out in the atmosphere of $O_2$, $Ar_2$ or a mixture thereof, and the plasma-etching abrades particles out of the Alumite layer surface by bumping plasma against the Alumite layer. Accordingly, after etching, the surface becomes rough and the surface roughness remarkably varies due to the presence of the abraded powder ($SiO_2$, $Al_2O_3$) in Alumite pores and the impurities ($Fe_3Si$ and the like) in the Alumite film, which respectively have different etching rates.

In other words, according to the above process, the plasma-etching is employed to secure the required surface precision taking the small pore area ratio into consideration, but the surface roughness after etching remarkably varies, which consequently leads to large variation in the friction coefficient over the entire surface of the magnetic disk. Thus, it is difficult to prevent the sticking of a magnetic head and the head crush, and it is also difficult to reduce the spacing between the magnetic head and the magnetic disk.

SUMMARY OF THE INVENTION

An object of the present invention is to solve the above mentioned problems by providing a magnetic disk having a magnetic thin film on the surface of a substrate, said substrate having an anodized aluminum film treated by chemical dissolution different from the known texture-treating method after mirror surface-finishing in such manner as to form a texture structure completely different from those of the known substrates, thereby forming uniform surface roughness so as to reduce the friction coefficient of the magnetic disk to a magnetic head and to provide constantly stable friction coefficient over the entire surface of the magnetic disk.

Thus, the above object can be achieved by providing a process for preparing a magnetic disk, which comprises (a) subjecting a substrate having an anodized aluminum film to mirror surface-finishing, (b) widening pores of the anodized aluminum film by chemical dissolution treatment such as electrolytic etching so that the total area of pores becomes from 20 to 80% of the entire surface area, thereby retaining crystalline alumina of the anodized aluminum film extruded after the chemical dissolution treatment, and (c) coating the resultant substrate with a magnetic continuous thin film.

It is preferable to widen the pores of the anodized aluminum film to a depth of 50–10,000 Å, preferably 50–500 Å.

It is also preferable that the anodized aluminum film has a (111) crystal face as the predominant face.

DETAILED DESCRIPTION OF THE INVENTION

Figure 1:
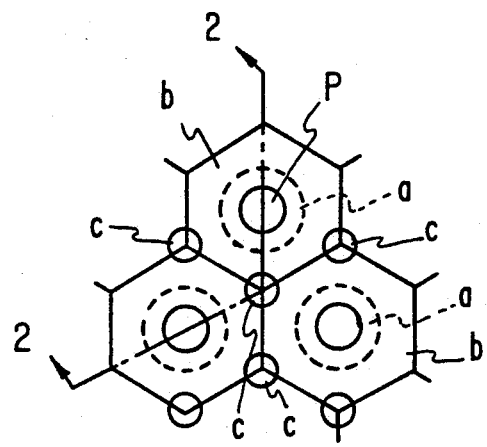
FIG. 1 is a magnified plan view showing a part of an anodized aluminum film

The pores of the anodized aluminum (Alumite) film on the substrate of the magnetic disk of the present invention are widened by chemical dissolution. The crystal structure of the anodized aluminum film has a three-layered structure comprising crystalline alumina located outermost from the inner wall of a pore, amorphous alumina and amorphous alumina containing acid or alkali ions located innermost of the pore. The crystalline alumina is hardest to be dissolved, thus remaining after chemical dissolution treatment so as to provide quite uniform distribution of extruded parts on the surface of the substrate. A magnetic thin film subsequently formed on the surface of the substrate grows faithfully along the above extruded parts.

Thus, the pore-widening treatment by chemical dissolution achieves not only the widening of the pore diameters but also the formation of uniformly distributed extrusion parts of the crystalline alumina, which contribute to the reduction of the area of the surface in contact with a magnetic head. In addition to the above advantages, the widening of pores achieves an effect to remove the abrasion residues in the pores.

The surface roughness of the substrate formed by texture-treatment by chemical dissolution in accordance with the present invention is uniform over the entire surface, and does not substantially vary depending on the length of treating time.

In this manner, the pore area ratio is adjusted in such manner as that the total area of pores constitutes from 20 to 80% of the entire surface area, and the abrasion residues in pores are removed. Consequently, the area of the magnetic disk surface constituted by the extruded parts of the crystalline alumina in contact with a magnetic head becomes very small, and an extremely thin air film is formed between the magnetic disk and the magnetic head, whereby the friction coefficient between the magnetic head and the magnetic disk is remarkably reduced.

Especially when the depth of pores is selected suitably within a range of from 50 to 10,000 Å, the friction reducing effect is ensured, and the retention of a lubricant is improved so that the friction coefficient can be maintained at a low level for a long period of time.

The process for preparing a magnetic disk in accordance with the present invention is effective for reducing costs in mass production since it is only required to conduct pore widening treatment in an electrolytic bath for dissolution after usual anodic oxidation treatment of aluminum by using the above-mentioned material and process, without requiring any special packing agent.

Now, the present invention will be described in further detail with reference to Examples. However, it should be understood that the present invention is by no means restricted by such specific Examples.

EXAMPLES

In a first step, an aluminum coating layer having a thickness of 1 μm was formed on the surface of a glass substrate by vacuum vapor deposition.

In a second step, the above substrate was subjected to anodic oxidation treatment in a 3% oxalic acid aqueous solution under an applied voltage of 50 V to form an anodized aluminum (Alumite) coating layer having a pore diameter of 370 Å, a cell size of 1,100 Å and an effective area of pores of 9%.

In a third step, after subjecting the above substrate to ordinary mirror surface-finishing, the resultant substrate was subjected to pore widening treatment by dipping the substrate in a 10% $H_3PO_4$ electrolyte at 30° C. for chemical dissolution.

By adjusting the treating time for the third step, 6 samples having various effective areas of pores as shown in Table 1 were obtained.

TABLE 1

| Sample No. | 1 | 2 | 3 | 4 | 5 | 6 |
|---|---|---|---|---|---|---|
| Treating time (min.) | 0 | 20 | 40 | 60 | 80 | 100 |
| Pore diameter (Å) | 340 | 480 | 600 | 750 | 870 | 1000 |
| Effective area (%) | 9 | 17 | 27 | 42 | 57 | 75 |

Figure 2:
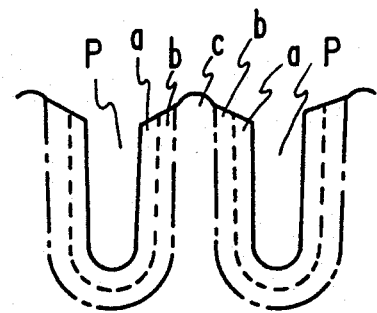
FIG. 2 is a section view along the line II—II of FIG. 1.

As can be seen from FIGS. 1 and 2, an anodized aluminum film generally has a three-layered crystal structure comprising crystalline alumina (c), amorphous alumina (b) and amorphous alumina (a) containing an acid or alkali ion, the crystalline alumina (c) being located outermost from a pore (P) and the amorphous alumina (a) being located innermost in the pore (P). Among the three layers, the crystalline alumina (c) is hardest to be dissolved, thus remaining extruded when pores are widened by the chemical dissolution. Consequently, a contacting area of a magnetic head with a magnetic disk using this substrate is remarkably small due to the presence of the widened pores and the extruded parts of the crystalline alumina (c) as compared with conventional products.

Figure 3:
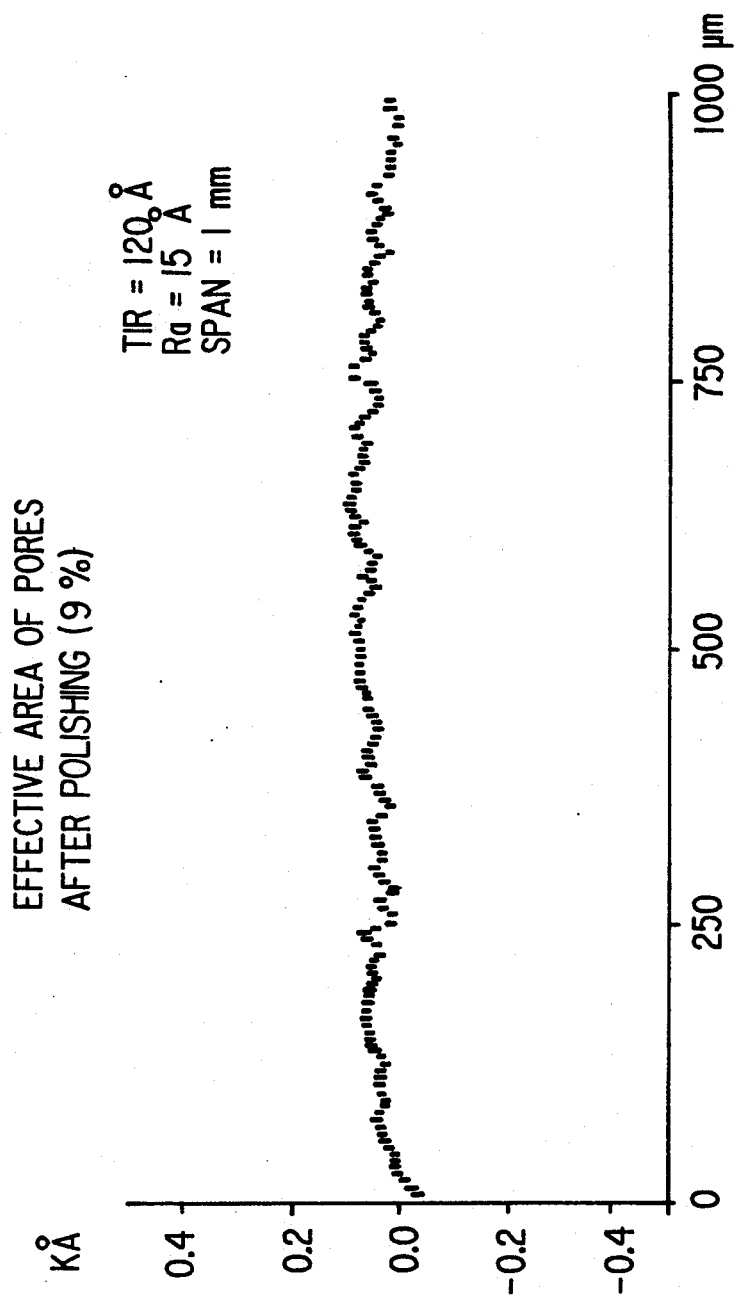
FIG. 3 is a graph showing the measurement result by a surface roughness measurer with regard to Sample No. 1 shown in Table 1.
Figure 4:
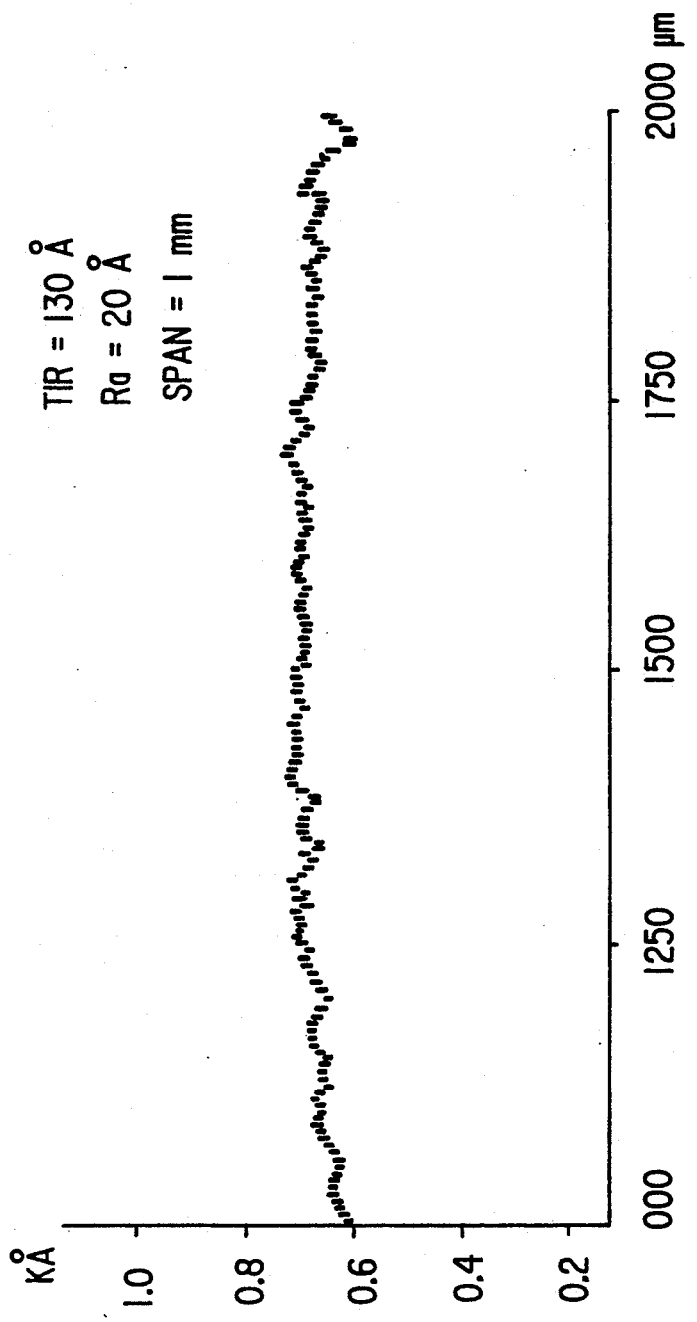
FIG. 4 is also a graph showing the measurement result of the surface roughness of Sample No. 4 by the same surface roughness measurer.

As can be seen from FIGS. 3 and 4, surface roughness achieved by subjecting pores of an anodized aluminum film to the texture treatment by chemical dissolution does not vary depending on the length of the dissolution treating time. FIGS. 3 and 4 are graphs showing the measurement results of surface roughness of Sample Nos. 1 and 4 shown in Table 1 by a contacting type surface roughness measurer (manufactured by Tensor Instruments, U.S.A.).

Figure 5:
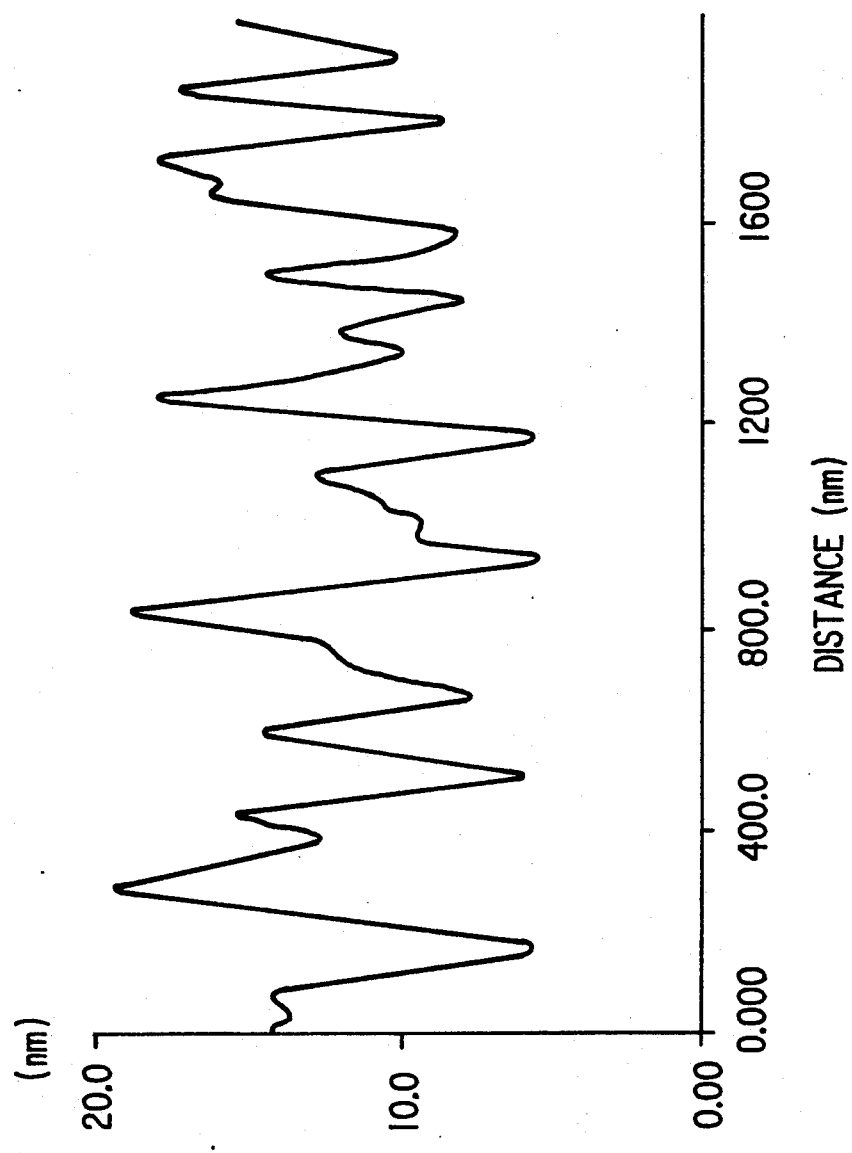
FIG. 5 is a graph showing the measurement result by STM with regard to Sample No.3.

FIG. 5 is a graph showing the measurement results of surface roughness of Sample No. 4 by a scanning tunnel microscope (STM).

The concavo-convex pitches of the surface roughness of the substrate of the present invention can not be numerically measured by an ordinary surface roughness measurer since the concavo-convex pitches are in cell size unit (1,000 Å). However, as can be seen from FIG. 5, according to the scanning tunnel microscope, the concavo-convex (roughness) of the surface was 200–150 Å, thus being very uniform. This is due to the fact that the pore distribution of an anodized aluminum (Alumite) film is very uniform and the dissolution rate of the anodized aluminum film by chemical dissolution does not remarkably vary. The dissolution rate of the same layer of the three layered structure is equal although the dissolution rate varies a little depending on each layer.

Figure 6:
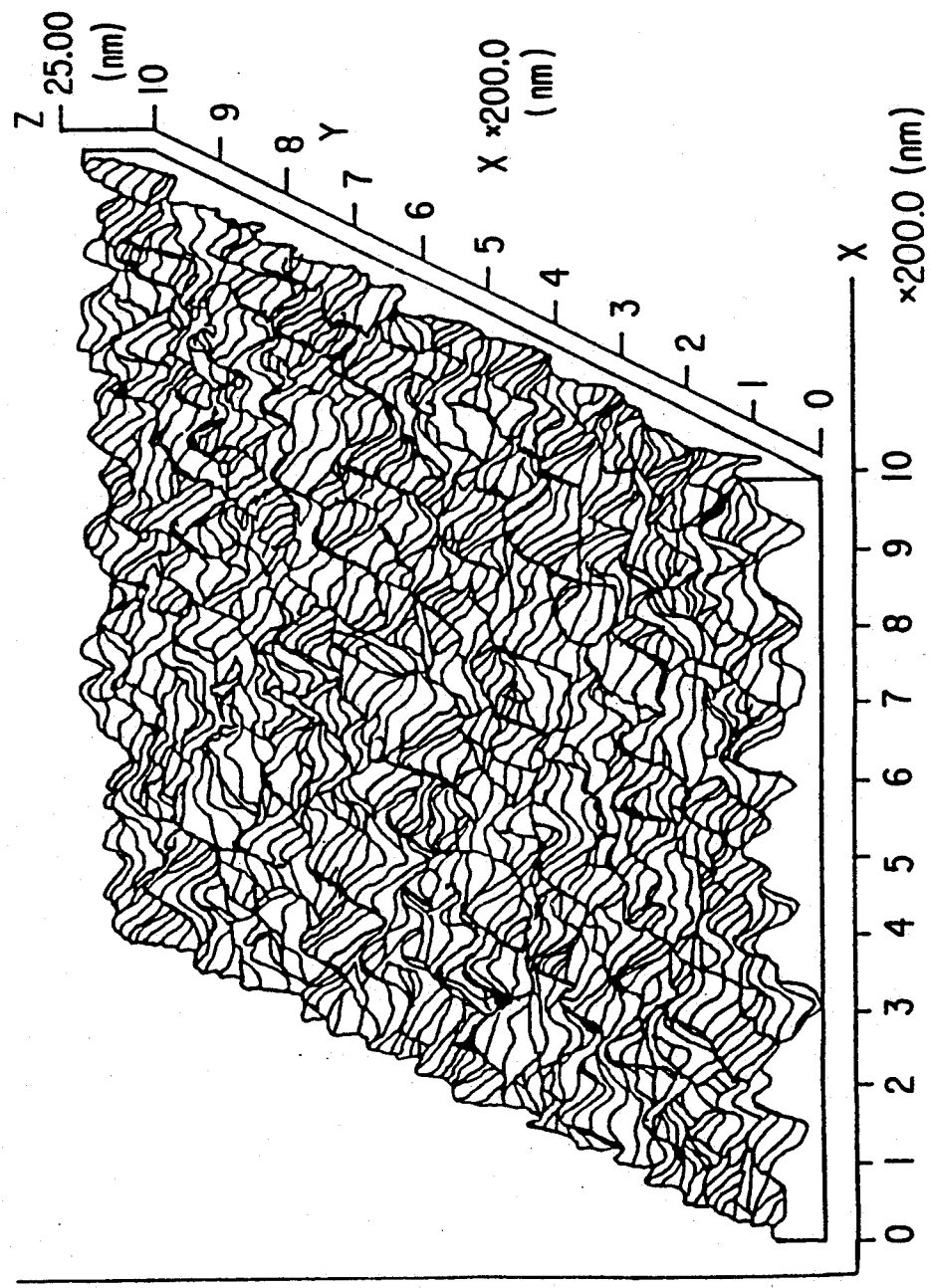
FIG. 6 is a three dimensional picture by STM with regard to the magnetic disk prepared by using Sample No. 3.

FIG. 6 shows a three-dimensional picture by a scanning tunnel microscope (STM) with regard to a magnetic disk prepared by coating Cr (2,000 Å), Co-Ni-Cr (550 Å) and C (300 Å) on the Sample No. 3 substrate shown in Table 1 by sputtering. It can be understood that the concavo-convex pattern of $R_{max}$ 200 Å is formed on the surface.

Thus, the surface roughness of the disk prepared in accordance with the present invention is much more uniform as compared with the surface roughness of $R_{max}$ 1,100 Å achieved by plasma etching. Consequently, the space between a magnetic head and the magnetic disk of the present invention can be remarkably reduced, thus enabling high density recording.

Figure 7:
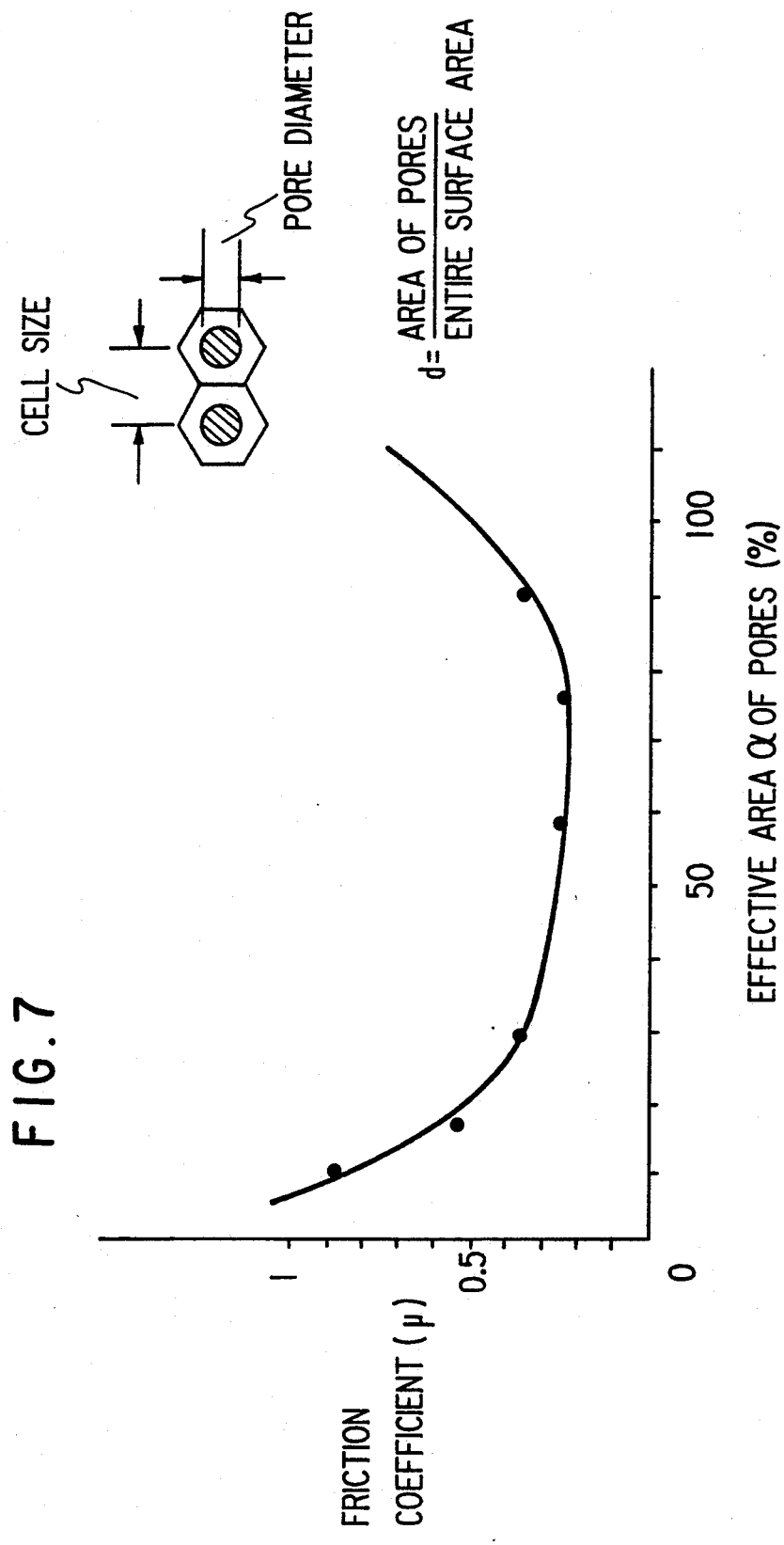
FIG. 7 is a graph showing the relation between the effective area of pores and the friction coefficient of the substrate surface.

FIG. 7 shows the change in the friction coefficient when the pore diameter was changed to change the effective area of pores while maintaining the cell size to be constant, as mentioned above.

For the measurement of the friction coefficient, a substrate having a carbon coating layer of 200 Å applied after the pore widening treatment to harden the substrate surface was used. The friction coefficient in the case where a liquid lubricant is applied to the substrate surface having enlarged pores showed a constant value of 0.2 in the predetermined range of the effective area of pores, and the line connecting the measured values became a horizontal straight line.

As is evident from FIG. 7, the friction coefficient increases if the effective area of pores is less than 20%. This is because the sticking force of the medium to the magnetic head increases. Further, if the effective area of pores exceeds 80%, the substrate surface tends to be brittle, whereby the friction coefficient likewise increases.

Figure 8:
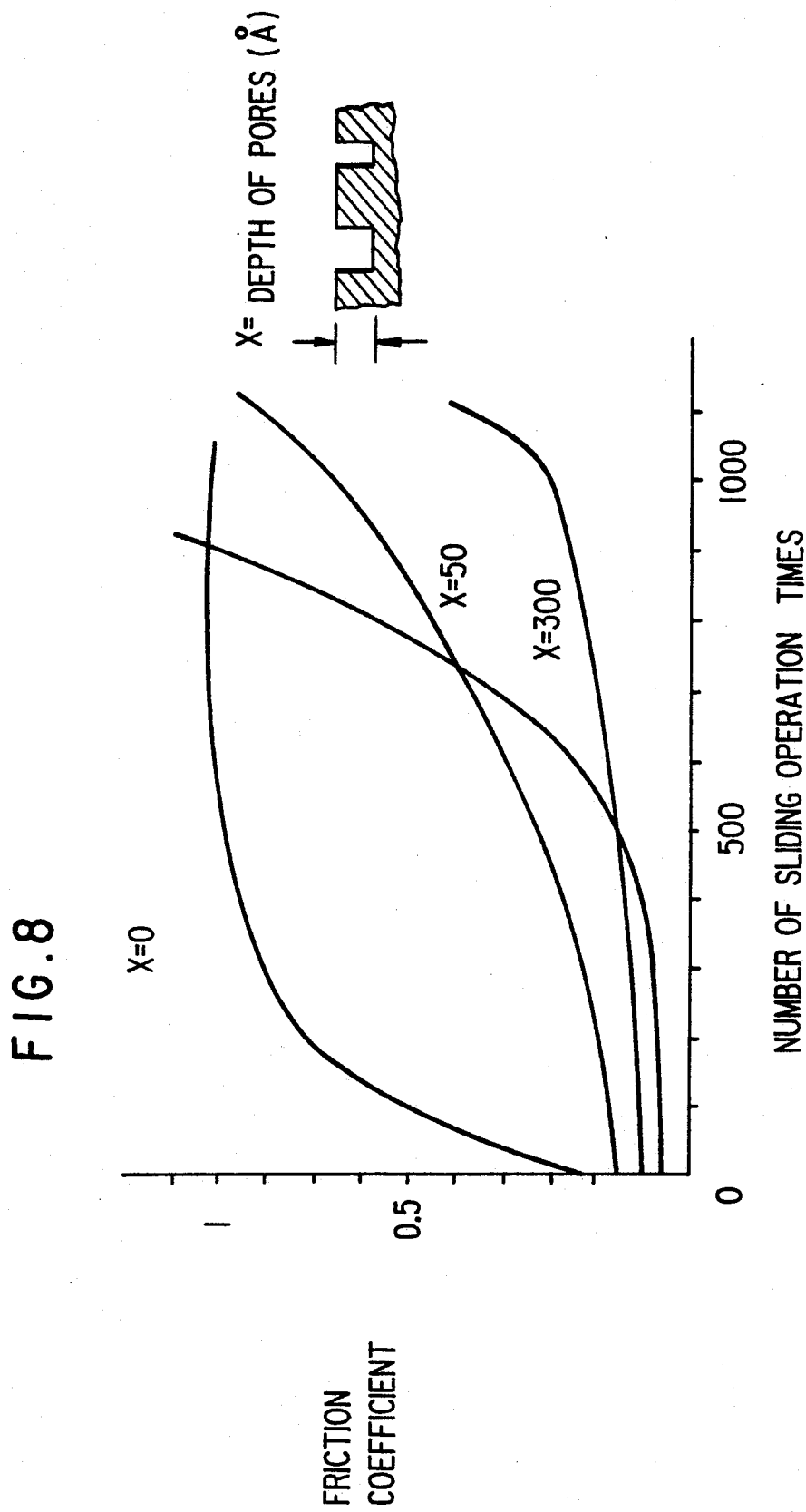
FIG. 8 is a graph showing the relation between the depth of pores and the friction coefficient.

By adjusting the electric amount for the formation of anodized aluminum (Alumite) film, the pore depth was varied, and the relation between the various pore depths and the friction coefficients was investigated. For the measurement, a substrate having a carbon coating layer of 200 Å on its surface and a magnetic head made of Mn-Zn alloy having a weight of 15 g were used. The results of the measurement are shown in FIG. 8.

As is evident from the Figure, the friction reducing effect appears at a level of about 50 Å. If the depth of pores exceeds 10,000 Å, the friction coefficient tends to increase again since a lubricant, etc. are likely to enter the pores. Further, when the depth of pores exceeds 500 Å, bit errors tend to increase. For this reason, the depth of pores is preferably from 50 to 500 Å.

In the above Examples, the coating layer was formed by vapor deposition of aluminum on the surface of a glass plate, and then subjecting the layer to anodic oxidation treatment (Alumite treatment), and this represents merely one example of the hard substrate and the method for forming an aluminum coating layer. As the hard substrate, besides a glass plate, an aluminum alloy plate may be employed. Further, for the formation of an aluminum coating layer, sputtering or any other known methods may be employed in place of vapor deposition method. An aluminum or aluminum alloy substrate may be directly subjected to anodization (Alumite) treatment without forming an aluminum film thereon.

As mentioned above, one of the objects of the present invention is to overcome the problem of magnetic head crush by utilizing the physicochemical properties of the anodized aluminum coating layer. Namely, by virtue of the smoothness of the coating layer surface, head crush is prevented, while the pores are widened by dissolution to adjust the effective area of the pores to a proper level and a small contacting area is secured by uniform concavo-convex surface formed by preparing extruded parts of crystalline alumina of three-layered structure on Alumite film, so that the friction coefficient can be reduced.

From this viewpoint, for the aluminum coating layer of the substrate of the present invention, it is ideal to use an aluminum coating layer having a (111) crystal face as the predominant face. The (111) face is most excellent in the surface precision. Accordingly, when an aluminum coating layer having such a (111) face as the predominant face is used for the substrate, the smoothness of the surface will be excellent, whereby the problem of the head crush will be completely solved.

A magnetic disk of the present invention is prepared by depositing a magnetic material of Co-Cr alloy or Co-Ni alloy on the substrate surface after the pore widening treatment, by sputtering, plating or other known method. Such a magnetic thin film gows following the surface roughness of the substrate, whereby the texture structure provided by the enlarged pores is maintained.

Figure 9:
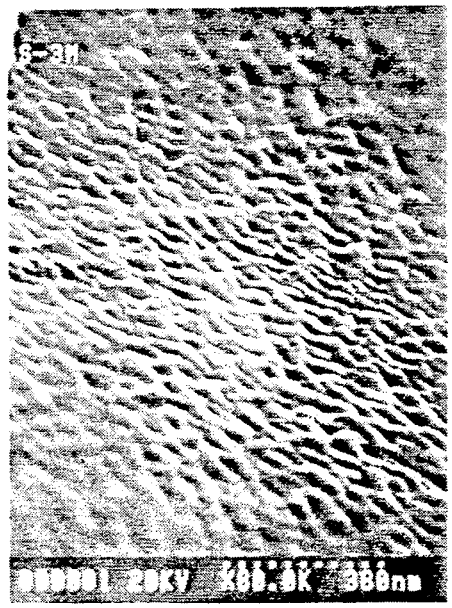
FIG. 9 is a microscopic photograph of the metal texture showing the surface state of a magnetic disk prepared in accordance with the present invention.

FIG. 9 is a microscopic photograph of a magnified ratio showing the state of the surface of a substrate coated with a magnetic thin film and further with a carbon layer.

When an aluminum alloy substrate is anodized (Alumite-treated) and the pores of the Alumite film is widened, it is preferably that the Alumite film has a thickness of not less than 4 μm. In this case, when the depth of the pores is large, the bottoms of the pores may optionally be filled up with a lubricant to retain the lubricant on the surface of the substrate. However, it is related with the viscosity of the lubricant used as to whether the bottoms of the pores should be filled up or not.

As described in the foregoing, according to the present invention, the texture is obtained by controlling the proportion of the area of pores on the surface of the anodized aluminum (Alumite) coating layer by chemical dissolution, and therefore, the concavo-convex surface is remarkably uniform as compared with the texture prepared by the conventional plasma etching method. Consequently, the friction coefficient is stabilized on the entire surface and head crush scarcely takes place.

I claim:

1. A process for preparing a magnetic disk which comprises forming a magnetic continuous thin film on a concavo-convex roughened surface of an aluminum film, said method of forming a magnetic thin film consisting essentially of (a) subjecting a substrate having an anodized aluminum film having a three-layered structure comprising crystalline alumina, amorphous alumina and amorphous alumina containing an acid or alkali ion to mirror surface-finishing, (b) treating the anodized aluminum to chemical dissolution treatment thereby widening pores of the anodized aluminum film so that total area of pores becomes from 20 to 80% of the entire surface area and that the depth of said pores becomes from 50 to 500 Å, thereby retaining crystalline alumina of the anodized aluminum film extruding after the chemical dissolution treatment, whereby a concavo-convex surface is formed on said anodized alumina film and (c) coating said concavo-convex surface resulting from said chemical dissolution treatment with a magnetic continuous thin film directly on said anodized aluminum film subjected to chemical dissolution treatment.

2. The process according to claim 1, wherein said chemical dissolution treatment is electrolytic etching.

3. The process according to claim 1, wherein the substrate is further coated with a carbon layer.

4. The process according to claim 1, wherein the substrate is a glass plate, an aluminum plate or an aluminum alloy plate, having an anodized aluminum film.

5. The process according to claim 1, wherein the magnetic continuous thin film comprises a Co-Cr alloy or a Co-Ni alloy.

6. The process according to claim 1, wherein the anodized aluminum film has a thickness of at least 4 µm.

7. A process for preparing a magnetic disk, which comprises (a) subjecting a substrate having an anodized aluminum film having a (111) crystal face as the predominant face to mirror surface-finishing, (b) widening pores of the anodized aluminum film by chemical dissolution treatment so that the total area of pores becomes from 20 to 80% of the entire surface area, thereby retaining crystalline alumina of the anodized aluminum film extruded after the chemical dissolution treatment, and (c) coating the resultant substrate with a magnetic continuous thin film.

* * * * *